United States Patent
Itakura

[11] Patent Number: 6,045,113
[45] Date of Patent: Apr. 4, 2000

[54] FRAME DAMPER

[75] Inventor: Masayuki Itakura, Tokyo, Japan

[73] Assignee: Polymatech Co., Ltd., Japan

[21] Appl. No.: 09/019,235

[22] Filed: Feb. 5, 1998

[30] Foreign Application Priority Data

Feb. 20, 1997 [JP] Japan .................................. 9-051094

[51] Int. Cl.[7] .................................................. F16M 13/00
[52] U.S. Cl. ........................................... 248/635; 369/263
[58] Field of Search ................................. 248/672, 677, 248/603, 605, 615, 634, 635, 560; 369/263

[56] References Cited

U.S. PATENT DOCUMENTS

| | | | |
|---|---|---|---|
| 2,088,566 | 8/1937 | Avery | 248/615 |
| 4,385,025 | 5/1983 | Salerno et al. | 264/255 |
| 4,619,432 | 10/1986 | Beugin | 248/635 |
| 4,718,631 | 1/1988 | Reynolds et al. | 248/615 |
| 4,719,526 | 1/1988 | Okita et al. | 369/77.2 |
| 4,731,777 | 3/1988 | Yoshitoshi et al. | 369/263 |
| 4,794,588 | 12/1988 | Yoshitoshi et al. | 369/263 |
| 4,812,932 | 3/1989 | Hishinuma et al. | 360/97.01 |
| 5,096,153 | 3/1992 | Seeley et al. | 248/635 |
| 5,174,540 | 12/1992 | Gilliam | 248/635 |
| 5,871,199 | 2/1999 | Koike et al. | 248/638 |

FOREIGN PATENT DOCUMENTS 1020994  12/1957  Germany .................. 248/634

*Primary Examiner*—Anita M. King
*Attorney, Agent, or Firm*—McGlew and Tuttle, P.C.

[57] ABSTRACT

The present invention employs a high elastic body with E value more than $1.2 \times 10^4 \text{kg/cm}^2$ as the high elastic body to be used for a body frame which supports a mechanical chassis of optical disk equipment or the like, while it also employs an elastic body with E value less than $1.0 \times 10^4 \text{kg/cm}^2$ which aims at vibration damping and with rubber hardness JIS-A Class less than 70 as a low elastic body to be used for an installing portion of the mechanical chassis. By integral-molding both low and high elastic bodies, a frame damper is formed, thereby controlling and isolating even vibration caused by high double-speed rotation of a disk and by integral-molding both the low elastic body of the installing portion of the mechanical chassis and the high elastic body of the body frame, it omits an assembly process using a fixing pin and improves working efficiency.

5 Claims, 4 Drawing Sheets

Table 1

| | Comparitive Ex. | Embodiment 1 | Embodiment 2 | Embodiment 3 | Embodiment 4 |
|---|---|---|---|---|---|
| Hardness of a low elastic body | 40 | 40 | 40 | 40 | 30 |
| High elastic body tan δ | -- | 0.005 | 0.01 | 0.05 | 0.05 |
| Vibration transmissibility (%) | 10 | 10 | 10 | 10 | 5 |
| G value in the parallel direction with a disk | 2 | 0.7 | 0.5 | 0.4 | 0.4 |

FIG. 6

FRAME DAMPER

FIELD OF THE INVENTION

The present invention relates to a frame damper which reduces vibration of devices employing optical disk media such as an acoustic equipment, an video equipment, an information equipment, various precision equipment, especially a CD, a CD-ROM optical disk, a magneto-optical disk, a DVD, a DVD-ROM, etc. by means of vibration control or vibration isolation by using an elastic body.

BACKGROUND OF THE INVENTION

In conventional dampers supporting a mechanical chassis of an optical disk equipment, or the like, there is a damper 11 and a damper 21 as shown in FIG. 2 or FIG. 3 which are composed of one kind of elastic body. An installing structure as shown in FIG. 4 is generally known, which is constructed so as to embed the damper 21 into a mechanical chassis 12 and to fix it to the mechanical chassis 12 with a fixing pin 16 at the trunk portion of the damper. The fixing pin also fastens the damper to the body frame 15. As the result, this requires a lot of assembly process and the operation thereof is not extremely efficient.

Also, as shown in FIG. 5, there is another installing type available which is to fix a mechanical chassis so as to be put on a damper 31 and employs no pin for fixing it. In this type, since spring constant in the parallel direction with a disk surface is low, there is a drawback that the mechanical chassis 12, itself having an optical pick-up 14 and a rotation portion 17 for disc 13 greatly fluctuates in the case of an optical disk device rotating at high double-speed.

SUMMARY OF THE INVENTION

The present invention is so constituted that it does not change the conventional installing structure of a mechanical chassis, but that it changes an installing portion of a mechanical chassis into a rubber-like elastic body (hereinafter referred to as a low elastic body) and changes the body frame into a resin-like elastic body (hereinafter referred to as a high elastic body), thereby controlling and isolating even vibration caused by high double-speed rotation of a disk, by means of the body frame composed of two kinds of elastic bodies as described above.

Further, by integral-molding both the low elastic body of the installing portion of the mechanical chassis and the high elastic body of the body frame, it omits an assembly process using a fixing pin and improves working efficiency.

BRIEF DESCRIPTION OF THE DRAWINGS

FIG. 6 is a table showing the results of a vibration test.

DETAILED DESCRIPTION OF THE PREFERRED EMBODIMENTS

Figure 1:
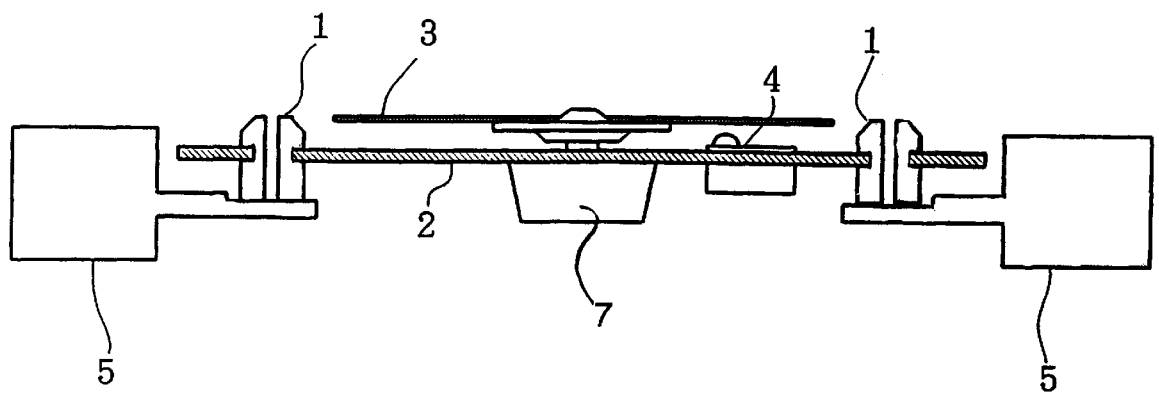
FIG. 1 is a longitudinal sectional view of a frame damper according to the present invention.
Figure 2:
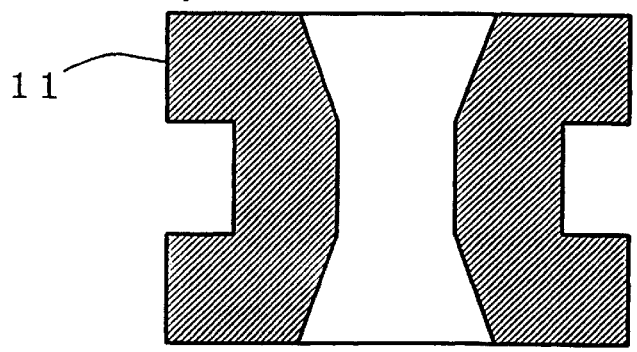
FIG. 2 is a longitudinal sectional view of a conventional push-up type damper.

For the above described reasons, the present invention employs a high elastic body with an E value greater than $1.2 \times 10^4 \text{kg/cm}^2$ as the high elastic body to be used for a body frame which supports a mechanical chassis of optical disk equipment or the like, while it also employs an elastic body with a dynamic elastic modulus (hereinafter referred to as E value) less than $1.0 \times 10^4 \text{kg/cm}^2$ which aims at vibration damping and with rubber hardness JIS-A Class less than 70 as a low elastic body to be used for an installing portion of the mechanical chassis. By integral-molding both low and high elastic bodies, a frame damper is formed. Further, it is more effective and desirable for damping vibration of a device to employ materials of high internal damping characteristics where the high elastic body has loss factor of tan $\delta$ more than 0.01 and the low elastic body has loss factor of tan $\delta$ more than 0.3. As for an elastic body for forming the frame damper, thermoplastic material or thermosetting material is used, while the frame damper is manufactured by well known processes, for example, such processes of bonding the low elastic body and the high elastic body together after molding them respectively by a metal mold or of molding either the low elastic body or the high elastic body by the metal mold first and then inserting it into the metal mold of the other remaining elastic body and/or of combined-molding by injection molding.

As materials of the low elastic body, elastomer having E value less than $1.0 \times 10^4 \text{kg/cm}^2$ such as styrene series thermoplastic elastomer. Olefinic series thermoplastic elastomer, polyster seriies thermoplastic elastomer, uretane series thermoplastic elastomer, or the like can be enumerated.

As materials of the high elastic body, thermosetting resin such as said thermoplastic elastomer or polyethylene(PE), polypropylene (PP), polyvinyl chloride (PVC), polystyrene (PS), acrylonitrile. styrene acrylate resin (ASA), acrylonitile. butadiene.styrene resin (ABS), polyamide (PA), polyacetal (POM), polycarbonate (PC), polyestylene terephthalate (PET), polybutylene terephthalate (PBT), polyphenylene oxide (PPO), polyphenylene sulfuide (PPS), theremoplastic resin or phenol resin such as polyurethane (PUR), epoxy resin (EP), silicon resin (SI), polyurethane (PUR), melamine resin (MF), polyester resin (UP), and so on can be enumerated.

By the frame damper according to the present invention, vibration isolation effect in the vertical direction to the disk surface can be identical with the vibration isolation effect of the conventional damper, and vibration in the direction parallel with the disk surface can be suppressed. Because the low elastic body reduces a natural frequency of the damper, the effect can be attained by taking E value of a rubber-like elastic body less than $1.0 \times 10^4 \text{kg/cm}^2$.

Also, by taking tan $\delta$ of the high elastic body more than 0.01, self-generating vibration can be reduced even the inside of the high elastic body and the effect of vibration control can be further increased.

Furthermore, by reducing a rubber hardness of the low elastic body, it becomes possible to easily reduce its spring constant and to enhance the vibration isolation characteristics in the vertical direction to the disk surface without lowering the vibration control characteristics in the parallel direction with the disk surface.

By employing thermoplastic materials of the low elastic body and the high elastic body, the damper according to the present invention is formed by insert molding with an ordinary injection molding machine, or by two color molding by using a plurality of dies. A number of manufacturing steps can be reduced as the result of automation and labor-saving. And when the mechanical chassis and the body frame are assembled the working process time can be reduced to about one-tenth (from 60 seconds to 6 seconds) and the assembly work can be made effectively.

EXAMPLE

Next, the present invention will be described in details as follows according to the embodiment as shown in FIG. 1.

The low elastic body 1 of an installing portion of mechanical chassis 2 to body frame 5 is formed to a hollow cylindrical shape from styrene group thermoplastic elastomer JIS-A Hs=40, E=50 kg/cm$^2$, Tan δ=0.35 in advance. Then, a high elastic body of body frame 5 which is made of PPE, E=2.0×10$^4$kg/cm$^2$, but with three different kinds of tan δ=0.005, tan δ=0.01 and tan δ=0.05 is integral-molded by a metal mold wherein the low elastic body formed in advance is inserted, thereby making a frame damper. The chassis 2 has an optional pickup 4 and a rotating portion 7. A test for vibration transmissibility in the vertical direction to the disk 3 and an examination of mechanical run-out characteristics by measuring the acceleration (G value) in the parallel direction with the disk 3 were conducted.

Figure 3:
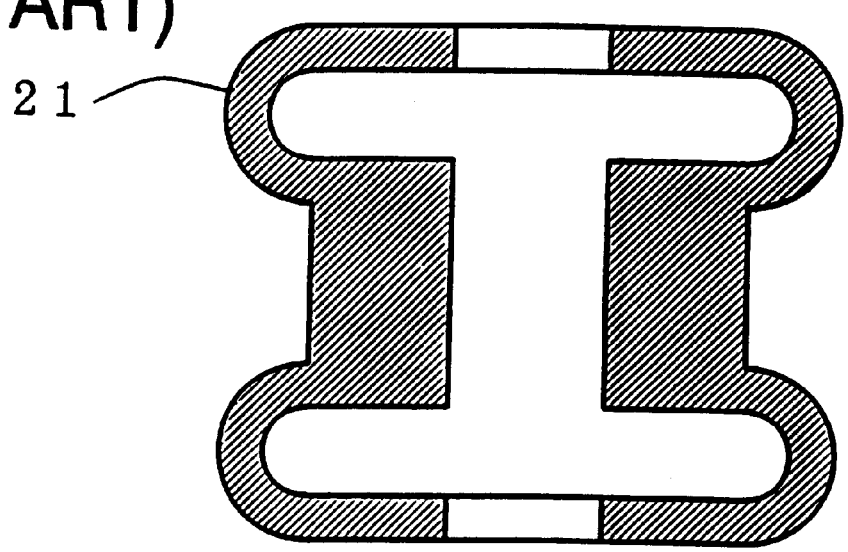
FIG. 3 is a longitudinal sectional view of the push-up type damper hollow-curved a supporting portion in the direction vertical to the conventional disk surface.
Figure 4:
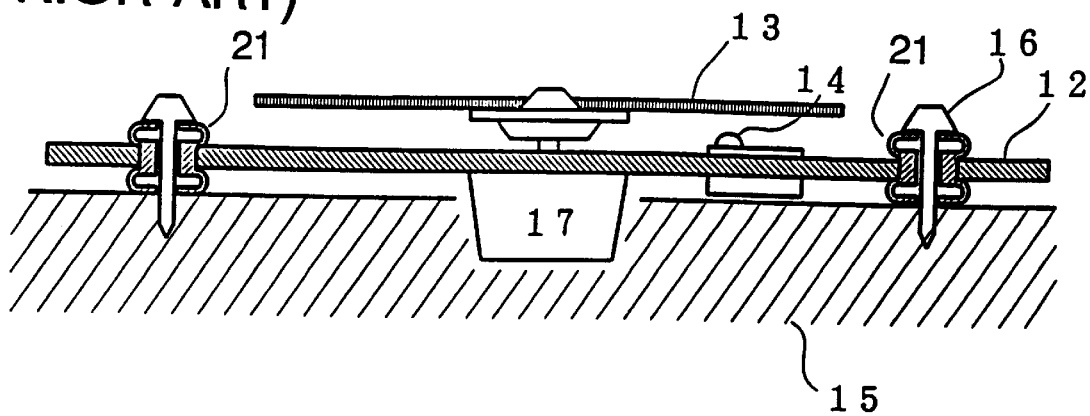
FIG. 4 is a longitudinal sectional view of a conventional mechanical chassis supported by a damper.
Figure 5:
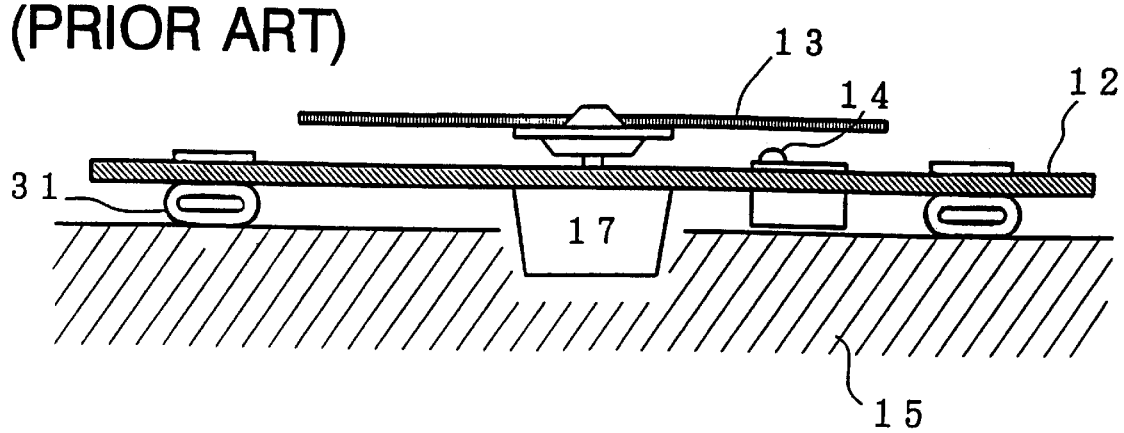
FIG. 5 is a longitudinal sectional view of an installing type damper without using a conventional fixing pin.

As a comparative example, the same test was conducted by using a similar shape as shown in FIG. 3. As a material, butyl rubber was used.

As a condition for the vibration test, a mechanical chassis of 120 g was supported by frame dampers at four points and was excited at a frequency of 100 Hz at which the disk is resonated. Acceleration on the mechanical chassis to the excitation acceleration of the vibration was measured and the acceleration on the mechanical chassis to the excitation acceleration of the vibration was obtained as a ratio (%). The result is shown in Table 1 of FIG. 6.

In vibration transmissibility in the vertical direction to the disk, that of the comparative example is identical with that of embodiments 1,2 and 3. In the embodiment 4, as the hardness of the low elastic body is reduced to 30°, the natural frequency is reduced and, as a result, the vibration transmissibility is also reduced and the vibration isolation effect is improved.

As for measurement of a mechanical run-out by G value in the parallel direction with the disk, since a spring constant in the parallel direction with the disk is not enough in the case of the conventional shape of the comparative example, G value becomes large, thereby causing the mechanical run-out. In the embodiment 1, since spring constant in the parallel direction with the disk is obtained, G value can be reduced to one third of the conventional damper shape. In the embodiments 2, 3 and 4, since materials of high loss factor are employed and for the high elastic body, it becomes possible to reduce G value furthermore.

Although the embodiments of the present invention have been described as above in details, the present invention can take various shapes according to installing methods or shapes required by the other party.

I claim:

1. A frame damper for a rotating device, the frame damper comprising:

a body frame made of a resin-like elastic body, said body frame having a dynamic elastic modulus greater than 1.2×10$^4$ kg/cm$^2$;

an installing portion connected to said body frame, said installing portion being made of a rubber-like elastic body, said installing portion having a dynamic elastic modulus than 1.0×10$^4$ kg/cm$^2$;

a mechanical chassis connected to said installing portion;

a rotating portion connected to said mechanical chassis;

a disk connected to said rotating portion and being rotatable by said rotating portion.

2. A frame damper as claimed in claim 1, wherein:

said installing portion is formed of thermoplastic material;

said body frame is formed of one of thermosetting and thermoplastic material.

3. A frame damper as claimed in claim 1, wherein:

a non-contact pick-up device reading information from said disk is connected to said chassis.

4. A frame damper as claimed in claim 1, wherein:

said disk is one of an optical disk, a magnetic disk and a magneto-optical disk.

5. A frame damper as claimed in claim 1, wherein:

said installing portion is formed of thermoplastic material;

said body frame is formed of one of thermosetting and thermoplastic material;

a non-contact device reading information from said disk is connected to said chassis;

said disk is one of an optical disk, a magnetic disk and a magneto-optical disk.

* * * * *